US008823491B2

(12) United States Patent
Luke et al.

(10) Patent No.: US 8,823,491 B2
(45) Date of Patent: Sep. 2, 2014

(54) SECURITY-ENHANCED RADIO FREQUENCY OBJECT LOCATOR SYSTEM, METHOD AND PROGRAM STORAGE DEVICE

(75) Inventors: Shawn M. Luke, Williston, VT (US); Michael R. Ouellette, Westford, VT (US); Karl V. Swanke, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 13/348,866

(22) Filed: Jan. 12, 2012

(65) Prior Publication Data

US 2013/0181838 A1 Jul. 18, 2013

(51) Int. Cl.

| | |
|---|---|
| ***G08B 5/22*** | (2006.01) |
| ***G08B 13/14*** | (2006.01) |
| ***G08B 1/08*** | (2006.01) |
| ***G01S 13/08*** | (2006.01) |
| ***G01B 11/14*** | (2006.01) |

(52) U.S. Cl.
USPC . 340/8.1; 340/572.1; 340/539.1; 340/539.13; 342/126; 356/623

(58) Field of Classification Search
CPC ........... G08B 13/1427; G08B 21/0269; G08B 26/007; G06K 7/10366; G06K 7/10386; G06K 2017/0045; G01S 13/08; G01S 13/878
USPC ........ 340/8.1, 572.1, 539.1, 539.13; 342/126; 356/623
See application file for complete search history.

(56) References Cited

U.S. PATENT DOCUMENTS

| | | | | |
|---|---|---|---|---|
| 6,012,029 | A | 1/2000 | Cirino et al. | |
| 6,225,906 | B1 * | 5/2001 | Shore | 340/573.4 |
| 6,490,560 | B1 | 12/2002 | Ramaswamy et al. | |
| 6,684,176 | B2 | 1/2004 | Willins et al. | |
| 6,891,469 | B2 | 5/2005 | Engellenner | |
| 6,956,538 | B2 | 10/2005 | Moore | |
| 6,989,741 | B2 * | 1/2006 | Kenny et al. | 340/505 |
| 7,046,141 | B2 | 5/2006 | Pucci et al. | |
| 7,113,099 | B2 | 9/2006 | Tyroler et al. | |

(Continued)

OTHER PUBLICATIONS myZOMM-app, http://zomm.com/products#app.

(Continued)

*Primary Examiner* — George Bugg
*Assistant Examiner* — Munear Akki
(74) *Attorney, Agent, or Firm* — Gibb & Riley, LLC; David A. Cain, Esq.

(57) ABSTRACT

Disclosed are an object locator system, a method and a program storage device. In the embodiments, radio frequency identification (RFID) tags are on objects within a defined area and each RFID tag can be activated by an RF activation signal. When a request (e.g., a verbal or keyed-in request) to locate a specific object is received from a specific user, the required permission to locate the object is verified and, optionally, the identity of the specific user is authenticated. Once the required permission is verified and the identity of the specific user is authenticated, one of three RFID readers transmits an RF activation signal. RF response signals received back at the three RFID readers from the specific object's RFID tag are used to triangulate the position of the specific object. Once determined, the position is communicated (e.g., by map display, verbal message, or text message) to the specific user.

20 Claims, 8 Drawing Sheets

(56) References Cited

U.S. PATENT DOCUMENTS

| | | | | |
|---|---|---|---|---|
| 7,274,292 | B2 | 9/2007 | Velhal et al. | |
| 7,342,497 | B2 * | 3/2008 | Chung et al. | 340/572.1 |
| 7,375,632 | B1 | 5/2008 | Sebanc | |
| 7,558,574 | B2 | 7/2009 | Feher | |
| 7,589,616 | B2 | 9/2009 | Klatsmanyi et al. | |
| RE41,080 | E | 1/2010 | Mahoney | |
| 7,791,471 | B2 | 9/2010 | Glynn et al. | |
| 7,817,032 | B2 | 10/2010 | Wilcox | |
| 7,986,230 | B2 | 7/2011 | Gabara | |
| 2002/0126010 | A1 | 9/2002 | Trimble et al. | |
| 2002/0130775 | A1 | 9/2002 | Engellenner | |
| 2005/0116823 | A1 * | 6/2005 | Paulsen et al. | 340/539.13 |
| 2007/0229350 | A1 * | 10/2007 | Scalisi et al. | 342/350 |
| 2007/0285230 | A1 | 12/2007 | Anglin | |
| 2008/0030325 | A1 | 2/2008 | Fries | |
| 2009/0295570 | A1 | 12/2009 | Simon et al. | |
| 2009/0315717 | A1 | 12/2009 | Soomro et al. | |
| 2010/0245113 | A1 | 9/2010 | Schmehl et al. | |
| 2011/0050412 | A1 | 3/2011 | Wittman et al. | |
| 2013/0179692 | A1 * | 7/2013 | Tolba et al. | 713/179 |

OTHER PUBLICATIONS

Sweeney, et al., "Material Handling & Logistics News, Voice,Scan, Screen and RFID: A Marriage of Convenience," Dec. 1, 2010, http://mhlnews.com/news/voice-scan-screen-rfid-1201/index1.html.

Johnson, WJ, IBM TDS, "Method for Identifying Optimal Interface Use in Voice-Controlled System," IPCOM000106122D, Sep. 1, 1993, 3 pages.

IBM, "Item Locator for a Large Store Using IBM Websphere Voice Application Acess Technology," IPCOM000028373D, May 13, 2004, 3 pages.

Liu, et al., Survey of Wireless Indoor Positioning Techniques and Systems, IEEE Transactions on Systems, Man, and Cybernetics—Part C: Applications and Reviews, vol. 37, No. 6, Nov. 2007, pp. 1067-1080.

* cited by examiner

SECURITY-ENHANCED RADIO FREQUENCY OBJECT LOCATOR SYSTEM, METHOD AND PROGRAM STORAGE DEVICE

BACKGROUND

1. Field of the Invention

The embodiments disclosed herein relate to locating lost, misplaced or stolen objects and, more particularly, to a security-enhanced radio frequency (RF) object locator system, method and program storage device.

2. Description of the Related Art

Various different object locator systems are available for locating lost, misplaced or stolen objects (e.g., keys, telephones, remote controls, tablet computers, etc.). Such object locator systems typically rely on visual and/or auditory indicators (i.e., lights and/or sounds) emitted either by the object itself or by a portable device used to track the object. However, attempting to locate an object based on visual and/or auditory indicators can often be imprecise and difficult. Furthermore, such object locator systems are typically designed so that they can be activated by anyone. However, there may be circumstances in which the owner of an object may want to prevent others from having access to that object. For example, a parent may want to prevent a child from having access to a lockbox or car key. Therefore, there is a need in the art for a security-enhanced object locator system that provides for easier, more precise, tracking of objects.

SUMMARY

In view of the foregoing disclosed herein are embodiments of a security-enhanced radio frequency (RF) object locator system, which triangulates the position of a specific object for a specific user, when that specific user has the required permission. Also disclosed are associated method and program storage device embodiments. Specifically, in the embodiments, objects in the defined area can have radio frequency identification (RFID) tags and each RFID tag on each object can be activated by an RF activation signal. When a request (e.g., a verbal or keyed-in request) to locate a specific object is received from a specific user, the required permission can be verified and, optionally, the identity of the specific user can be authenticated. Once the required permission is verified and, if applicable, the identity of the specific user is authenticated, one of three RFID readers within the defined area can transmit the RF activation signal. In response, a unique RF response signal can be transmitted by the RFID tag on the specific object and that RF response signal, as received back at each of the RFID readers, can then be used to triangulate the position of the specific object. Once determined, the position of the specific object within the defined area can be communicated (e.g., by map display or by voice or text message) to the specific user.

More specifically, disclosed herein are embodiments of a security-enhanced system for locating objects within a defined area. The system can comprise RFID tags on objects within the defined area. Each RFID tag on each object can be activatable by an RF activation signal. When activated, each RFID tag can transmit a unique RF response signal.

The system can further comprise a memory, a user interface device, three or more RFID readers within the defined area, and a computer, which is in communication with the memory, user interface device and RFID readers. The memory can store a database of all objects that are within the defined area and that have RFID tags. This database can associate the objects with the corresponding users having the required permission to locate them. The user interface device can receive, from a specific user, a request (e.g., a verbal or keyed-in request) to locate a specific object. The computer can access the database in response to the request in order to verify that the specific user has the required permission to locate the specific object. Optionally, the computer can also authenticate the identity of the specific user (e.g., by requiring the user to enter a verbal or keyed-in passcode, by voice print recognition or other biometric security measures, etc.).

Once the required permission is verified and, if applicable, the identity of the specific user is authenticated, the computer can initiate a triangulation process for determining the position of the specific object within the defined area. Specifically, the computer can cause one of the RFID readers to transmit an RF activation signal. The RFID tag on the specific object can, in response to the RF activation signal, automatically transmit its own unique RF response signal. Each RFID reader can receive the RF response signal from the RFID tag. The computer can then triangulate the position of the specific object within the defined area based on differences in the RF response signal from the RFID tag as received at each of the RFID readers (e.g., based on differences in signal strength, time of arrival delay, etc.). Once the position of the specific object is determined, the computer can communicate that position to the specific user through the user interface device (e.g., by text message, by voice message, by map display, etc.).

Also disclosed herein are embodiments of a security-enhanced computer-implemented method for locating objects within a defined area. The objects can have RFID tags and each RFID tag on each object can be activatable by an RF activation signal. When activated, each RFID tag can transmit a unique RF response signal.

The method embodiments can comprise storing, in memory, a database of all objects that are within the defined area and that have RFID tags. This database can associate the objects with the corresponding users having the required permission to locate them. The method embodiments can further comprise receiving, through a user interface device, a request (e.g., a verbal or keyed-in request) from a specific user to locate a specific object. In response to this request, the database can be accessed in order to verify that the specific user has the required permission to locate the specific object. Optionally, the identity of the specific user can also be authenticated (e.g., by requiring the user to enter a verbal or keyed-in passcode, through the use of voice print recognition or other biometric security measures, etc.).

Once the required permission is verified and, if applicable, the identity of the specific user is authenticated, a triangulation process for determining the position of the specific object within the defined area can be performed. That is, the method embodiments can comprise selectively controlling one of three RFID readers to cause the RFID reader to transmit an RF activation signal. In response to the RF activation signal, the RFID tag on the specific object can automatically transmit its unique RF response signal and each of the three RFID readers can receive that RF response signal. Triangulation of the position of the specific object within the defined area can then be performed based on differences in the RF response signal as received at each of the RFID readers (e.g., based on differences in signal strength, in time of arrival delay, etc.). Once the position of the specific object is determined, the position can be communicated to the specific user through the user interface device (e.g., by text message, voice notification, map display, etc.).

Also disclosed herein are embodiments of a program storage device. This program storage device can be readable by a computer and can tangibly embody a program of instructions, which are executable by the computer to perform the above-described method for locating objects within a defined area.

BRIEF DESCRIPTION OF THE DRAWINGS

The embodiments disclosed herein will be better understood from the following detailed description with reference to the drawings, which are not necessarily drawn to scale and in which.

DETAILED DESCRIPTION

Figure 1:
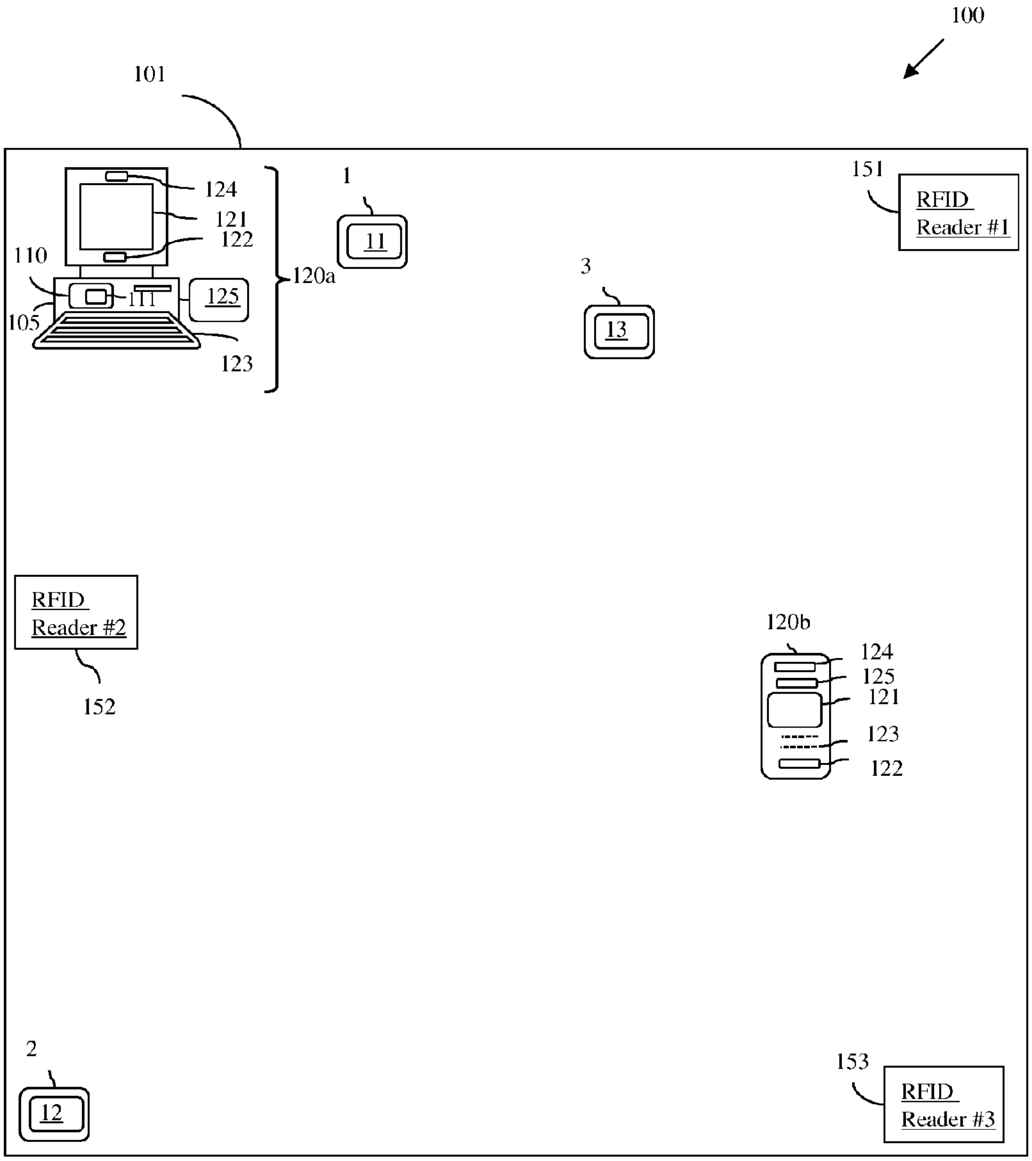
FIG. 1 is a schematic drawing illustrating an embodiment of a security-enhanced radio frequency (RF) object locator system.

As mentioned above, various different object locator systems are available for locating lost, misplaced or stolen objects (e.g., keys, telephones, remote controls, tablet computers, etc.). Such object locator systems typically rely on visual and/or auditory indicators (i.e., lights and/or sounds) emitted either by the object itself or by a portable device used to track the object. For example, many cordless telephone systems include a base from which any user can activate a locator beacon that causes a lost or misplaced cordless telephone to emit a sound and/or flash a light. The user attempts to locate the telephone by tracking the sound and/or light. Radio frequency (RF) object locator systems are also known. In RF object locator systems (e.g., see U.S. Pat. No. 7,046,141 of Pucci et al., issued May 16, 2006 and incorporated herein by reference) objects have radio frequency identification (RFID) tags that can be activated by a portable locator device. An activated RFID tag causes the portable locator device to emit sound and/or light, which changes as the user moves closer to the object (e.g., the sound will get louder and/or the light will get brighter the closer the user is to the object). However, attempting to locate an object based on visual and/or auditory indicators can often be imprecise and difficult, particularly for individuals that are vision and/or hearing impaired. Furthermore, the various object locator systems described above are typically designed so that they can be activated by anyone. However, there may be circumstances in which the owner of an object may want to prevent others from having access to the object. For example, a parent may want to prevent a child from having access to a lockbox or car key. Therefore, there is a need in the art for a security-enhanced object locator system that provides for easier, more precise, tracking of objects.

In view of the foregoing disclosed herein are embodiments of a security-enhanced radio frequency (RF) object locator system, which triangulates the position of a specific object for a specific user, when that specific user has the required permission. Also disclosed are associated method and program storage device embodiments. Specifically, in the embodiments, objects in the defined area can have radio frequency identification (RFID) tags and each RFID tag on each object can be activated by an RF activation signal. When a request (e.g., a verbal or keyed-in request) to locate a specific object is received from a specific user, the required permission can be verified and, optionally, the identity of the specific user can be authenticated. Once the required permission is verified and, if applicable, the identity of the specific user is authenticated, one of three RFID readers within the defined area can transmit the RF activation signal. In response, an RF response signal can be transmitted by the RFID tag on the specific object and that RF response signal, as received back at each of the three RFID readers, can then be used to triangulate the position of the specific object. Once determined, the position of the specific object within the defined area can be communicated (e.g., by map display, voice message or text message) to the specific user.

More specifically, referring to FIG. 1, disclosed herein are embodiments of a security-enhanced system 100 for locating objects 1, 2, 3 within a defined area 101. The objects 1, 2, 3 can, for example, comprise essentially portable objects that can be easily lost, misplaced or stolen (e.g., keys, telephones, glasses, remote controls, tablet computers, etc.). Additionally, the defined area 101 can comprise a house, an apartment, a condominium, a living space, a building, an office, a work space, or any other defined area, subject to the wireless communication range limitations between the various system components, which are discussed in detail below.

The system 100 can comprise RFID tags 11, 12, 13 (i.e., RFID transponders) on the objects 1, 2, 3, within the defined area. The RFID tags 11, 12, 13 can be affixed to or otherwise adhered to the objects 1, 2, 3. For example, the RFID tags 11, 12, 13 can be configured as stickers. Alternatively, the RFID tags 11, 12, 13 can be embedded in the objects themselves (e.g., during manufacturing). As with conventional RFID tags, each RFID tag 11, 12, 13 can comprise an antenna, a transmitter, a receiver and a microprocessor (i.e., an integrated circuit) having a memory. Each RFID tag 11, 12, 13 can be activatable by an RF activation signal. That is, each RFID tag 11, 12, 13 can be activated (i.e., can be programmed to be activated, adapted to be activated, configured to be activated, etc.) upon receipt of an RF activation signal. Once activated, each RFID tag 11, 12, 13 can transmit (i.e., can be adapted to transmit, configured to transmit, programmed to transmit, etc.) a unique RF response signal (i.e., an RF response signal that is unique to the RFID tag). For each object, the unique RF response signal from the RFID tag can comprise a unique identification code associated with the object.

The system 100 can further comprise a memory 110, user interface device(s) 120*a* and/or 120*b*, three or more RFID readers 151, 152, 153 (i.e., RFID interrogators), and a computer 105, which is in communication with the memory 110, user interface device 120*a-b* and RFID readers 151-153.

The memory 110 can store a database 111 of all objects 1, 2, 3 that are within the defined area and that have RFID tags 11, 12, 13, respectively. This database 111 can use descriptive text to refer to the objects 1, 2, 3 (e.g., "lockbox key" for object 1, "living room television remote control" for object 2, "car keys" for object 3, etc.) and can further associate the objects 1, 2, 3 with their unique identification codes and with the corresponding users having the required permission to locate them.

The user interface device 120*a*, 120*b* can allow (i.e., can be adapted to allow, configured to allow, etc.) a specific user to enter a request to locate a specific object. This request can specify the user (e.g., by name or other identifier) and can also specify the object (e.g., object 1) to be located. For example, the request can state, "This is John Doe. Locate my lockbox key".

Figure 2:
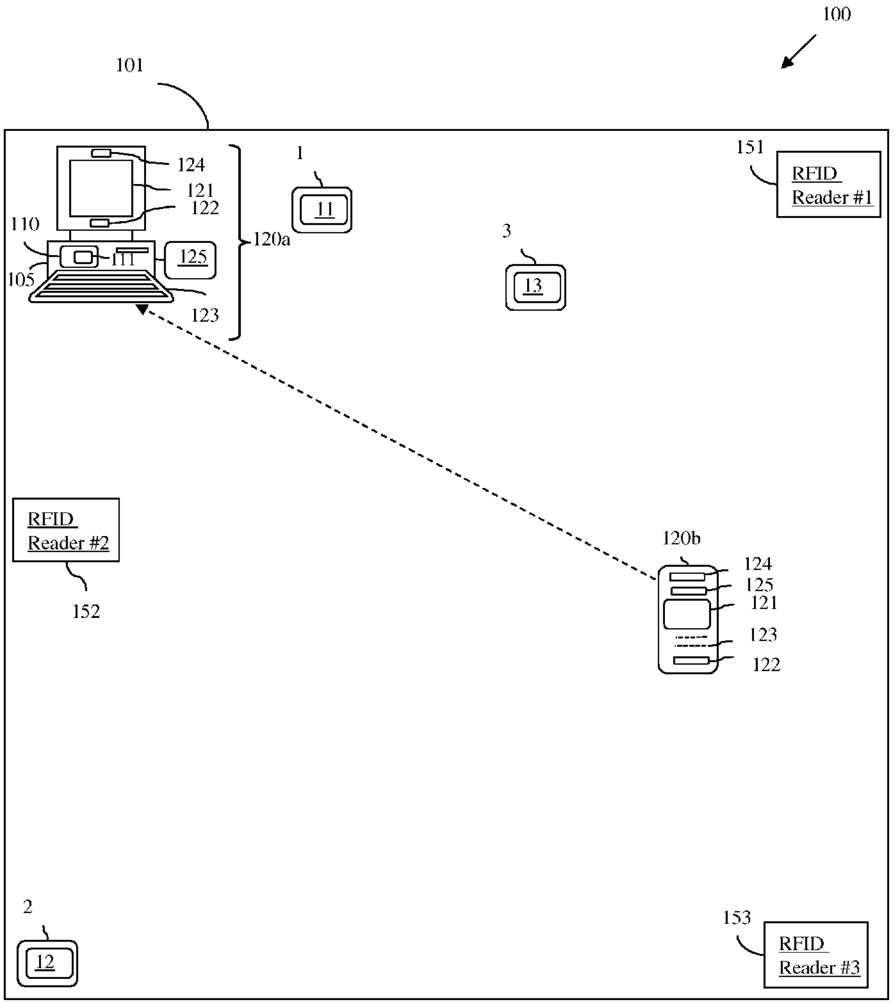
FIG. 2 is a schematic drawing illustrating communication between a handheld user interface device and a computer within the system of FIG. 1.

The user interface device can comprise a graphical user interface (GUI) 120*a* incorporated into the computer system 105. Additionally or alternatively, the user interface device can comprise a handheld (i.e., portable) user interface device 120*b*, which can be either a single function device (i.e., a device designed for use only as an object locator) or a multi-function device (e.g., a smart phone, tablet computer, etc.) that incorporates an object locator application. The handheld user interface device 120*b* can communicate wirelessly (i.e., can be adapted to communicate wirelessly, configured to communicate wirelessly, etc.) with the computer system 105 from anywhere within the defined area 101 (as shown in FIG. 2). The use of wireless communication links (e.g., wireless network communication links, Bluetooth® communication links, etc.) between portable devices and a computer is well known in the art and, thus, the details are omitted from this specification in order to allow the reader to focus on the salient aspects of the disclosed embodiments. In any case, the user interface device 120*a*, 120*b* can at least comprise a display 121 and one or more input devices. The input device can comprise a microphone 122 for receiving a verbal request to be entered. Additionally or alternatively, the input device can comprise a keyboard, touchpad or touch screen 123 for receiving a keyed-in request. A keyed-in request can comprise, for example, a type or written request or a selection-based request (e.g., a request can be made keying in a selection from displayed list of objects and users).

The computer system 105 can access (i.e., can be adapted to access, configured to access, programmed to access, etc.) the database 111 in response to the request in order to verify that the specific user has the required permission to locate the specific object (e.g., Does John Doe have the required permission to locate the lockbox key?). Optionally, the computer system 105 can also authenticate (i.e., be adapted to authenticate, configured to authenticate, programmed to authenticate, etc.) the identity of the specific user (i.e., to confirm that the requestor is in fact John Doe).

For example, in one embodiment, the computer system 105 can authenticate the identity of the user by requiring the user to enter a verbal or keyed-in passcode. Specifically, the database 111 can further associate unique passcodes (i.e., passwords, personal identification numbers (PINs), etc.) with the corresponding users. Upon receipt of a request from a specific user to locate a specific object, the computer system 105 can prompt (i.e., can be adapted to prompt, configured to prompt, programmed to prompt, etc.) the user to enter the appropriate passcode. For example, a user may be prompted to submit the passcode by a window appearing on the display 121 and may enter the passcode using the keyboard, touchpad, or touch-screen 123. Alternatively, the user may be prompted verbally (e.g., through a speaker 124 on the user interface device 120*a*, 120*b*) and may enter the passcode verbally through the microphone 122. The computer system 105 can then compare the entered passcode to the unique passcode associated with the specific user in the database 111 in order to authenticate the identity of the specific user.

In another embodiment, the computer system 105 can authenticate the identity of the specific user using voice print recognition or other biometric security measures. For example, the database 111 can further associate unique voice-prints with the corresponding users. In this case, the request can be a verbal request received from the specific user through the microphone 122 and the computer system 105 can authenticate (i.e., can be adapted to authenticate, configured to authenticate, programmed to authenticate, etc.) the identity of the specific user by accessing the database 111 and comparing the verbal request to the unique voiceprint of the specific user. Voiceprint recognition techniques used in other types of applications are well known in the art (e.g., see U.S. Pat. No. 6,490,560 of Ramaswamy et al., issued on Dec. 3, 2002, assigned to International Business Machines, Inc. and incorporated herein by reference) and, thus, the details of such voiceprint recognition techniques are omitted from this specification in order to allow the reader to focus on the salient aspects of the disclosed embodiments.

Alternatively, the database 111 can further associate some other unique biometric identifiers (e.g., fingerprints, retinal scans, face scans, etc.) with the corresponding users. In this case, the user interface device 120*a*, 120*b* can further comprise the appropriate biometric sensor 125 (e.g., a fingerprint scanner, a retinal scanner, facial scanner, etc.). Upon receipt of a request from a specific user to locate a specific object, the computer system 105 can prompt (i.e., can be adapted to prompt, configured to prompt, programmed to prompt, etc.) the user to submit to biometric sensing by the biometric sensor 125. For example, a user may be prompted to submit to biometric sensing by a window appearing on the display 121 or may be prompted verbally (e.g., through a speaker 124 on the user interface device 120*a*, 120*b*). The computer system 105 can then compare the entered biometric identifier to the unique biometric identifier associated with the specific user in the database 111 in order to authenticate the identity of the specific user. Biometric systems for authenticating a user's identity in other types of applications are well known in the art and, thus, the details of such systems are omitted from this specification in order to allow the reader to focus on the salient aspects of the disclosed embodiments.

Figure 3:
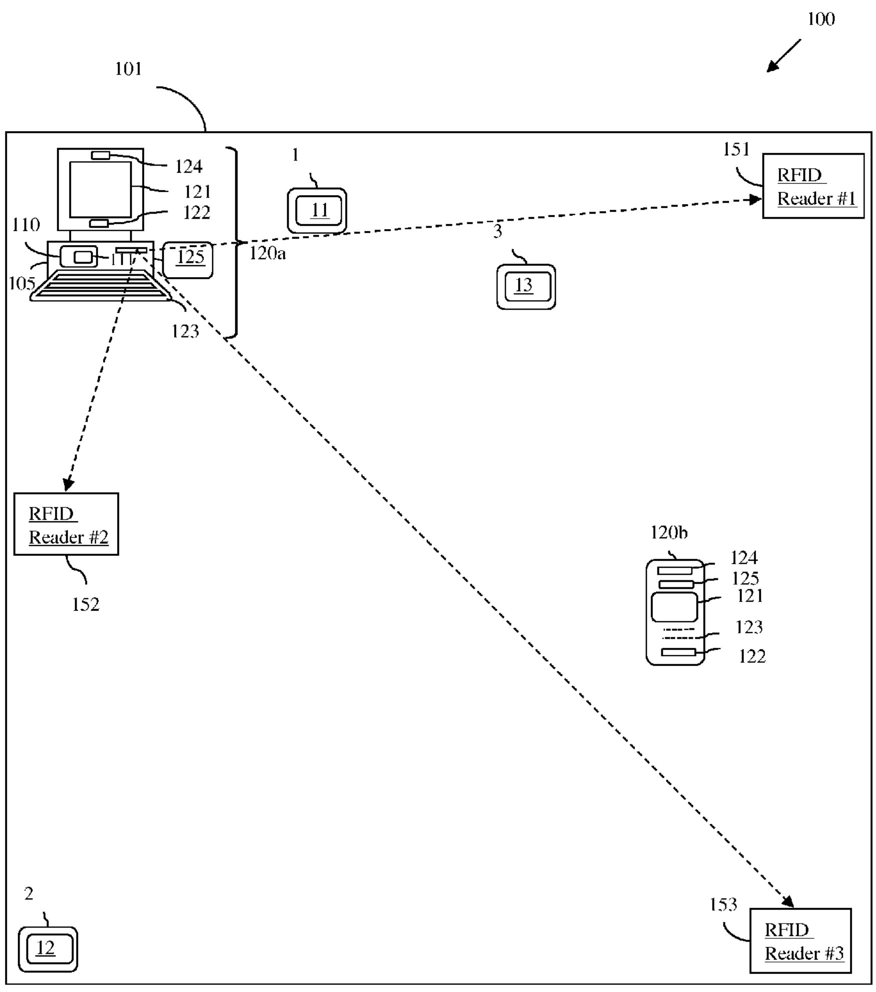
FIG. 3 is a schematic drawing illustrating communication between the computer and radio frequency identification (RFID) readers within the system of FIG. 1.
Figure 4:
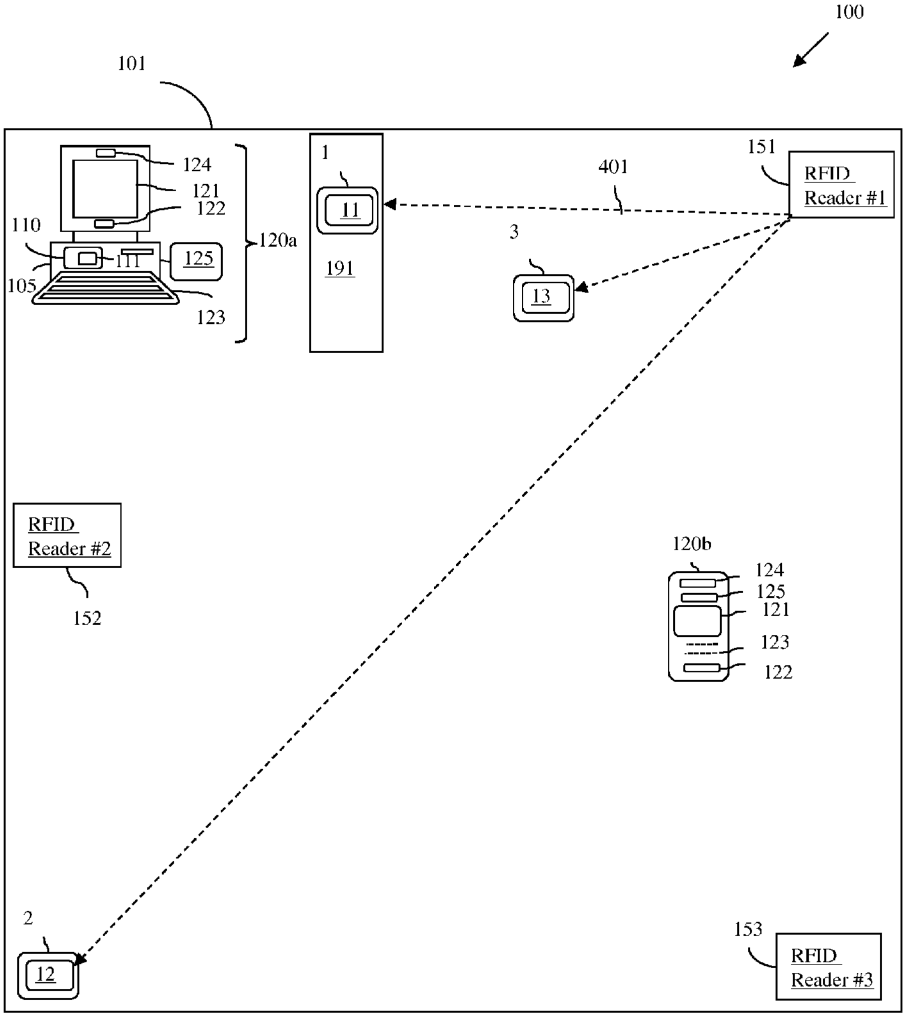
FIG. 4 is a schematic drawing illustrating communication from the radio frequency identification (RFID) readers and a radio frequency identification (RFID) tag within the system of FIG. 1.

Once the required permission is verified and, if applicable, the identity of the specific user is authenticated, the computer system 105 can initiate (i.e., can be adapted to initiate, configured to initiate, programmed to initiate, etc.) single the RFID readers 151-153 to initiate a triangulation process for determining the position of the specific object 1 within the defined area 101 (see FIG. 3). Specifically, the computer system 105 can selectively control the RFID readers 151, 152, 153 so as to cause one of the RFID readers (e.g., RFID reader 151) to transmit an RF activation signal 401, as shown in FIG. 4. It should be noted that communication between the RFID readers 151, 152, 153 and the computer system 105 can be wired (i.e., the RFID readers 151, 152, 153 can be electrically connected to the computer system 105) or, alternatively, can be wireless. Again, the use of wireless communication links (e.g., wireless network communication links, Bluetooth® communication links, etc.) between devices and a computer is well known in the art and, thus, the details are omitted from this specification in order to allow the reader to focus on the salient aspects of the disclosed embodiments.

Figure 5:
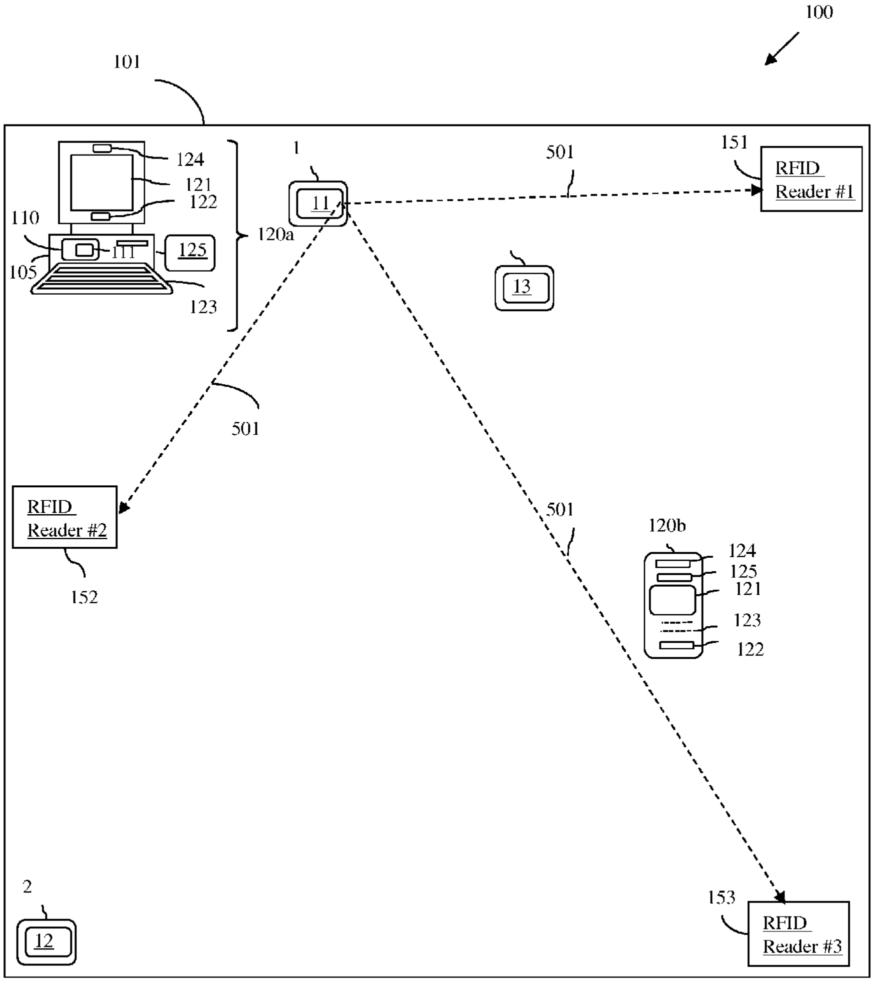
FIG. 5 is a schematic drawing illustrating communication from the radio frequency identification (RFID) tag to the radio frequency identification (RFID) readers within the system of FIG. 1.

In response to the RF activation signal 401 transmitted by the RFID reader 151, the RFID tag 11 on the specific object 1 can automatically transmit its own unique RF response signal 501 and each of the three RFID readers 151, 152, 153 can receive that unique RF response signal 501 from the RFID tag 11, as shown in FIG. 5. After the RFID readers 151, 152, 153 receive the RF response signal 501 from the RFID tag (e.g., from RFID tag 11 on the specific object 1), the computer system 105 can triangulate (i.e., can be adapted to triangulate, configured to triangulate, programmed to triangulate, etc.) the position of the specific object 1 within the defined area 101 based on differences between the RF response signal 501 as received at each of the RFID readers 151, 152, 153 (e.g., based on the differences in signal strength, in time of arrival delay, etc.). For example, the RFID readers 151, 152, 153 can each measure the signal strength (i.e., can be adapted to measure the signal strength, can be configured to measure the signal strength, etc.) of the received RF response signal 501 and/or can each record (i.e., can be adapted to record, configured to record, etc.) the time of arrival of the received RF response signal 501 and transmit this information to the computer system 105. Then, the different signal strengths of the unique RF response signal 501 upon arrival at the different RFID readers 151, 152, 153 and/or the different arrival times of the unique RF activation signal 501 at the different RFID readers 151, 152, 153 can be used by the computer system 105 to calculate the distances between each of the RFID readers 151, 152, 153 and the specific object 1. The precise position of the specific object 1 within the defined area 101 can then be triangulated by the computer system 105 based on the three different distances. Triangulation techniques for determining the position of an object based on the distance between that object and three other objects are well known in the art and, thus, the details of such techniques are omitted from this specification in order to allow the reader to focus on the salient aspects of the disclosed embodiments.

As mentioned above, the RFID tag 11 on the specific object 1 is activated by an RF activation signal 401. This RF activation signal 401 can be either generic or unique to the specific user or object. Specifically, in one embodiment, the RF activation signal 401 that is transmitted by the RFID reader 151 can be a generic RFID activation signal 401 that activates all of the RFID tags 11, 12, 13 within the defined area 101. In this case, the computer system 105 can sort all of the received RF response signals from all of the RFID tags 11, 12, 13 (e.g., based on the identification codes) to identity and process only the unique RF response signal 501 from the RFID tag 11 on the specific object 1. Alternatively, to limit the number of RF response signals, the computer system 105 can direct the RFID reader 151 to transmit an RF activation signal that is unique to the specific user so that only RFID tags on objects associated with the specific user (e.g., RFID tags 11 and 12 on objects 1 and 2) are activated. Alternatively, to limit the number of RF response signals even further, the computer system 105 can direct the RFID reader 151 to transmit an RF activation signal that is unique to the specific object 1 so that only the RFID tag 11 on that specific object 1 is activated. In such cases, the unique RF activation signal associated with a specific user or a specific object can also be stored in the database 111 and the computer system 105 can selectively control (i.e., can be adapted to selectively control, configured to selectively control, programmed to selectively control, etc.) the RFID reader 151 so that the appropriate RF activation signal is transmitted.

Once the computer system 105 determines the position of the specific object 1, it can communicate (i.e., can be adapted to communicate, configured to communicate, programmed to communicate, etc.) that position to the specific user through the user interface device 120*a*, 120*b*. Specifically, a map 600 (i.e., an architectural plan, blueprint, etc.) of the defined area 101, which may include stationary objects (e.g., furniture, appliances, etc.), can be stored in memory 110, see FIG. 6. The map 600 can divide the defined area 600 into spaces or rooms 181-185. Optionally, the map 600 can further indicate the position of one or more stationary objects 191-195 contained within the spaces 181-185, respectively. The spaces and, if applicable, the stationary objects contained therein can each be associated with descriptive text in the database 111 (e.g., "office" 181 and "desk" 191, "master bedroom" 182 and "bed" 192, "closet" 183 and "dresser" 193, "living room" 184 and "sofa" 194, and "dining room" 185 and "table" 195). The computer system 105 can access the map 600 and the descriptive text in the database 111 and communicate the position of the specific object to the specific user using the map 600 and/or the descriptive text.

For example, in one embodiment, the computer system 105 can display (i.e., can be adapted to display, configured to display, programmed to display, etc.) the map 600 on the display 121 of the user interface device 120*a*, 120*b*. The map 600 can include an indicator 601 marking the precise position of the specific object 1. The indicator 601 can comprise, for example, an alphanumeric indicator (e.g., "X" as shown) or any other suitable indicator (e.g., an icon, which may be representative of the object itself).

In another embodiment, the computer system 105 can communicate the position of the specific object to the specific user by transmitting a position notification message to the user interface device 120*a*, 120*b*. For example, a text message can be displayed on the display 121 of the user interface device 120*a*, 120*b*. Alternatively, a voice message, also referred to as a voice notification, can be played over a speaker 124 of the user interface device 120*a*, 120*b*. Such a message can, for example, indicate the space within which the specific object is located (e.g., "The lockbox key is the office.") or the general position of the specific object within that space (e.g., "The lockbox key is in the northeast corner of the office.").

In yet another embodiment, the position of the handheld user interface device 120*b* (and, thereby the position of the user holding that device) can also be triangulated and the position notification message can indicate the position of the specific object relative to the position of the handheld user interface device 120 or relative to the position of the user (e.g., "The lockbox key is 10 feet northwest of the user interface device 120*b*" or "The lockbox key is 10 feet in front of you".). This position notification message can be updated as the user holding the handheld user interface device 120*b* moves closer and/or farther away from the specific object.

To accomplish this, the user interface device 120*b* can have an additional RFID tag. Each of the RFID readers 151, 152, 153 can receive an additional RF response signal automatically transmitted from the additional RFID tag of the handheld user interface device 120*b* in response to an RF activation signal. In the same manner as described above with regard to the triangulation the position of the specific object 1, the computer system 105 can triangulate the position of the handheld user interface device 120 (i.e., based on differences in the additional RF response signal as received by each of the RFID readers 151, 152, 153). Then, the computer system 105 can communicate the position of the specific object relative to the position of the handheld user interface device 120*b*, as discussed above (e.g., by text or voice message).

Figure 7:
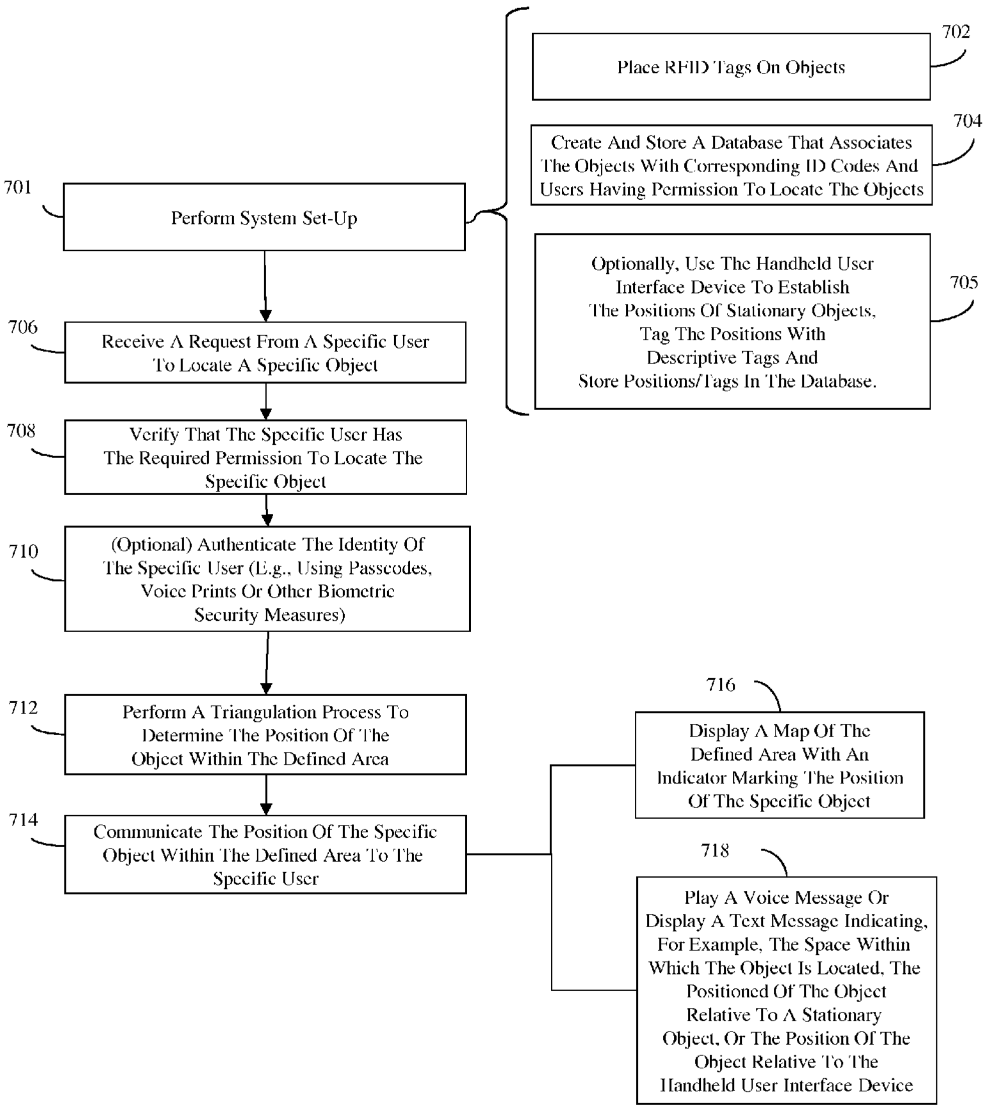
FIG. 7 is a flow diagram illustrating an object location method.

In another embodiment, the computer system 105 can communicate the position of the specific object relative to the position of a stationary object within the defined area and/or space (e.g., "The lockbox key is in the northeast corner of the office near the desk"). To accomplish this, the position of the stationary object must be pre-established. For example, during system set-up, the handheld user interface device 120_b_ can be placed adjacent to a specific stationary object and the position of the handheld user interface device 120_b_ can be triangulated, as described above. The user can then tag the position with an appropriate descriptive tag (e.g., “desk”) either verbally (e.g., using the microphone 122) or by text (e.g., using keyboard/touchpad/touchscreen 123) of the handheld user interface device 120_b_. The tag and position can be stored in the database 111. The position of the specific object relative to the position of one or more stationary objects can then be communicated, based on pre-set rules. The pre-set rules can, for example, require that a user be notified of the following: (1) any stationary objects within a given distance (e.g., 2 feet, 5 feet, etc.) of the specific object; (2) the relative position of the specific object between multiple stationary objects within space; etc. Referring to FIG. 7 in combination with FIG. 1, also disclosed herein are associated method embodiments for locating objects 1, 2, 3 within a defined area 101. As in the system embodiments discussed above, the objects 1, 2, 3 can, for example, comprise essentially portable objects that can be easily lost, misplaced or stolen (e.g., keys, telephones, glasses, remote controls, tablet computers, etc.). Additionally, the defined area 101 can comprise a house, an apartment, a condominium, a living space, a building, an office, a work space, etc.

The method embodiments can comprise performing initial system set-up (701). This set-up can comprise placing RFID tags 11, 12, 13 (i.e., RFID transponders) on the objects 1, 2, 3, within the defined area 101 (702). The RFID tags 11, 12, 13 can be affixed to or otherwise adhered to the objects 1, 2, 3. For example, the RFID tags 11, 12, 13 can be configured as stickers. Alternatively, the RFID tags 11, 12, 13 can be embedded in the objects themselves (e.g., during manufacturing). As with conventional RFID tags, each RFID tag 11, 12, 13 can comprise an antenna, a transmitter, a receiver and a microprocessor (i.e., an integrated circuit) having a memory. Each RFID tag 11, 12, 13 can be activatable by an RF activation signal. That is, each RFID tag 11, 12, 13 can be activated (i.e., can be programmed to be activated, adapted to be activated, configured to be activated, etc.) upon receipt of an RF activation signal. Once activated, each RFID tag 11, 12, 13 can transmit (i.e., can be adapted to transmit, configured to transmit, programmed to transmit, etc.) a unique RF response signal (i.e., an RF response signal that is unique to the RFID tag). For each object, the unique RF response signal from the RFID tag can comprise a unique identification code associated with the object. Additionally, a database 111 can be created and stored, in memory 110, of all objects 1, 2, 3 that are within the defined area 101 and that have RFID tags 11, 12, 13, respectively (704). This database 111 can use descriptive text to refer to the objects 1, 2, 3 (e.g., “lockbox key” for object 1, “living room television remote control” for object 2, “car keys” for object 3, etc.) and can further associate the objects 1, 2, 3 with their unique identification codes and with the corresponding users having the required permission to locate them.

The method embodiments can further comprise receiving a request from a specific user to locate a specific object (706). For example, the request can state, “This is John Doe. Locate my lockbox key”. This request can be received, for example, by the computer 105 through either a graphical user interface 120_a_ of the computer 105 or a handheld (i.e., portable) user interface device 120_b_, as discussed in detail above with regard to the system embodiments. In any case, the request can be received as a verbal request through a microphone 122 of the user interface device 120_a_, 120_b_ or as a keyed-in request (e.g., a typed or written request) through the keyboard, touchpad, or touchscreen 123 of the user interface device 120_a_, 120_b_.

In response to the request, the database 111 can be accessed (e.g., by the computer 105) in order to verify that the specific user has the required permission to locate the specific object (708). That is, the information in the database 111 can be reviewed to determine whether or not John Doe has the required permission to locate the lockbox key.

Optionally, the identity of the specific user can also be authenticated (e.g., by the computer 105) (710). That is, additional processes can be performed in order to confirm that the requestor is in fact John Doe.

For example, in one embodiment, the identity of the specific user can be authenticated by first requiring the user to enter a verbal or keyed-in passcode. In this case, the database 111 can associate unique passcodes (i.e., passwords, personal identification numbers (PINs), etc.) with the corresponding users. Upon receipt of a request by a specific user to locate a specific object, the user can be prompted to enter the appropriate passcode. For example, a user may be prompted to submit the passcode by a window appearing on the display 121 and may key-in the passcode using the keyboard, touchpad, or touchscreen 123. Alternatively, the user may be prompted verbally (e.g., through a speaker 124 on the user interface device 120_a_, 120_b_) and may enter the passcode verbally through the microphone 122. Next, the entered passcode can be compared to the unique passcode associated with the specific user in the database 111 in order to authenticate the identity of the specific user.

In another embodiment, the identity of the specific user can be authenticated using voice print recognition. In this case, the database 111 can associate unique voiceprints with the corresponding users. The request to locate the specific object can be a verbal request received from the specific user through the microphone 122. The identity of the specific user can then be authenticated comparing the verbal request to the unique voiceprint associated in the database 111 with the specific user.

In another embodiment, the identity of the specific user can be authenticated using any other biometric security measure. In this case, the database 111 can associate unique biometric identifiers (e.g., fingerprints, retinal scans, face scans, etc.) with the corresponding users. Upon receipt of a request by a specific user to locate a specific object, the user can be prompted to submit to biometric sensing by a biometric sensor 125 (e.g., a fingerprint scanner, a retinal scanner, facial scanner, etc.) on the user interface device 120_a_, 120_b_. For example, a user may be prompted to submit to biometric sensing by a window appearing on the display 121 or may be prompted verbally (e.g., through a speaker 124 on the user interface device 120_a_, 120_b_). The identity of the specific user can then be authenticated by comparing the entered biometric identifier to the unique biometric identifier associated in the database 111 with the specific user. Once the required permission is verified at process 708 and, if applicable, the identity of the specific user is authenticated at process 710, a triangulation process for determining the position of the specific object 1 within the defined area 101 can be performed (712). Specifically, the method can comprise selectively controlling at least one of the RFID readers (e.g., RFID reader 151) so as to cause that RFID reader 151 to transmit an RF activation signal 401, as shown in FIG. 4. In response to the RF activation signal 401 transmitted by the RFID reader 151, the RFID tag 11 on the specific object 1 can automatically transmit its own unique RF response signal 501 and each RFID reader 151, 152, 153 can receive that unique RF response signal 501 from the RFID tag 11, as shown in FIG. 5. After the RFID readers 151, 152, 153 receive the RF response signal 501 from the RFID tag (e.g., from RFID tag 11 on the specific object 1), the position of the specific object 1 within the defined area 101 can be triangulated based on differences between the RF response signal 501 as received at each of the RFID readers 151, 152, 153 (e.g., based on the differences in signal strength, in time of arrival delay, etc.) (see the detailed discussion above with the different triangulation techniques that can be used).

Once the position of the specific object 1 is determined at process 712, that position can be communicated (e.g., by the computer 105) to the specific user through the user interface device 120*a*, 120*b* (714).

Figure 6:
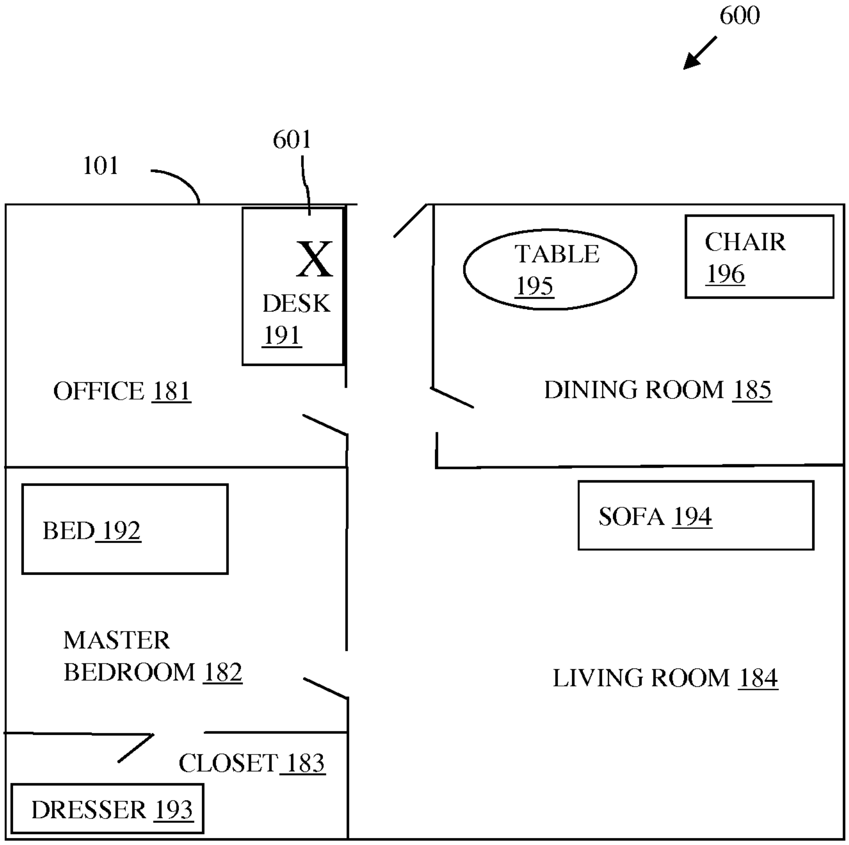
FIG. 6 is drawing illustrating an exemplary map that can be displayed to communicate the location of an object.

For example, in one embodiment, a map 600 (i.e., an architectural plan, blueprint, layout, etc.) of the defined area, which may include stationary objects (e.g., furniture, appliances, etc.), can be displayed on the display 121 of the user interface device 120*a*, 120*b* and this map 600 can include an indicator 601 marking the precise position of the specific object 1 (716, see FIG. 6). It should be noted that the map 600 of the defined area 101 can be stored in memory 110 and can divide the defined area 600 into spaces or rooms 181-185. Techniques for generating and storing maps (i.e., architectural plans, blueprints, etc.) of defined areas are known and, thus, are omitted from this specification in order to allow the reader to focus on the salient aspects of the embodiments. Optionally, the map 600 can further indicate the position of one or more stationary objects 191-195 contained within the spaces 181-185, respectively. Additionally, the spaces and, if applicable, the stationary objects contained therein can each be associated with descriptive text (e.g., "office" 181 and "desk" 191, "master bedroom" 182 and "bed" 192, "closet" 183 and "dresser" 193, "living room" 184 and "sofa" 194, and "dining room" 185 and "table" 195 and "chair" 196). The indicator 601 on the map 600 can comprise, for example, an alphanumeric indicator (e.g., "X" as shown) or any other suitable indicator (e.g., an icon, which may be representative of the object itself).

In another embodiment, the position of the specific object can be communicated to the specific user by transmitting a position notification message to the user interface device 120*a*, 120*b* (718). For example, a text message can be displayed on the display 121 of the user interface device 120*a*, 120*b*. Alternatively, a voice message, also referred to as a voice notification, can be played over a speaker 124 of the user interface device 120*a*, 120*b*. Such a message can, for example, indicate the space within which the specific object is located (e.g., "The lockbox key is the office."); the general position of the specific object within that space (e.g., "The lockbox key is in the northeast corner of the office."); the position of the specific object relative to the position of the handheld user interface device 120*b* or relative to the position of the user holding that handheld user interface device 120*b* (e.g., "The lockbox key is 10 feet northwest of the user interface device." or "The lockbox key is 10 feet northwest of you."); or the position of the specific object relative to a stationary object within that space (e.g., "The lockbox key is in the northeast corner of the office near the desk").

In order to communicate the position of the specific object relative to the position of the handheld user interface device 120*b*, the user interface device 120*b* can have an additional RFID tag. Each of the RFID readers 151, 152, 153 can receive an additional RF response signal automatically transmitted from the additional RFID tag of the handheld user interface device 120*b* in response to an RF activation signal. In the same manner as described above with regard to the triangulation the position of the specific object 1, the position of the handheld user interface device 120*b* can be triangulated (i.e., based on differences in the additional RF response signal as received by each of the RFID readers 151, 152, 153).

In order to communicate the position of the specific object relative to a stationary object within the defined area and/or space (e.g., "The lockbox key is in the northeast corner of the office near the desk"), the position of the stationary object must be pre-established. For example, during the initial system set-up at process 701, the handheld user interface device 120*b* can be placed adjacent to a specific stationary object and the position of the handheld user interface device 120*b* can be triangulated, as described above (705). The position can then be tagged with an appropriate descriptive tag (e.g., "desk"). Tagging can be performed either verbally (e.g., using the microphone 122) or by text (e.g., using keyboard/touchpad/touchscreen 123) of the handheld user interface device 120*b*. The tag and position can be stored in the database 111. The position of the specific object relative to the position of one or more stationary objects can then be communicated, based on pre-set rules. The pre-set rules can, for example, require that a user be notified of the following: (1) any stationary objects within a given distance (e.g., 2 feet, 5 feet, etc.) of the specific object; (2) the relative position of the specific object between multiple stationary objects within space; etc.

Also disclosed herein are embodiments of a program storage device (i.e., a computer program product) readable by a computer and tangibly embodying a program of instructions executable by the computer to perform the above-described object location method.

Specifically, as will be appreciated by one skilled in the art, aspects of the embodiments herein may be embodied as a system, method or program storage device (i.e., a computer program product). Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a non-transitory computer readable storage device or a computer readable signal medium. A non-transitory computer readable storage device may be, for example, but not limited to, an electronic, magnetic, optical, electromagnetic, infrared, or semiconductor system, apparatus, or device, or any suitable combination of the foregoing. More specific examples (a non-exhaustive database) of the non-transitory computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electromagnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
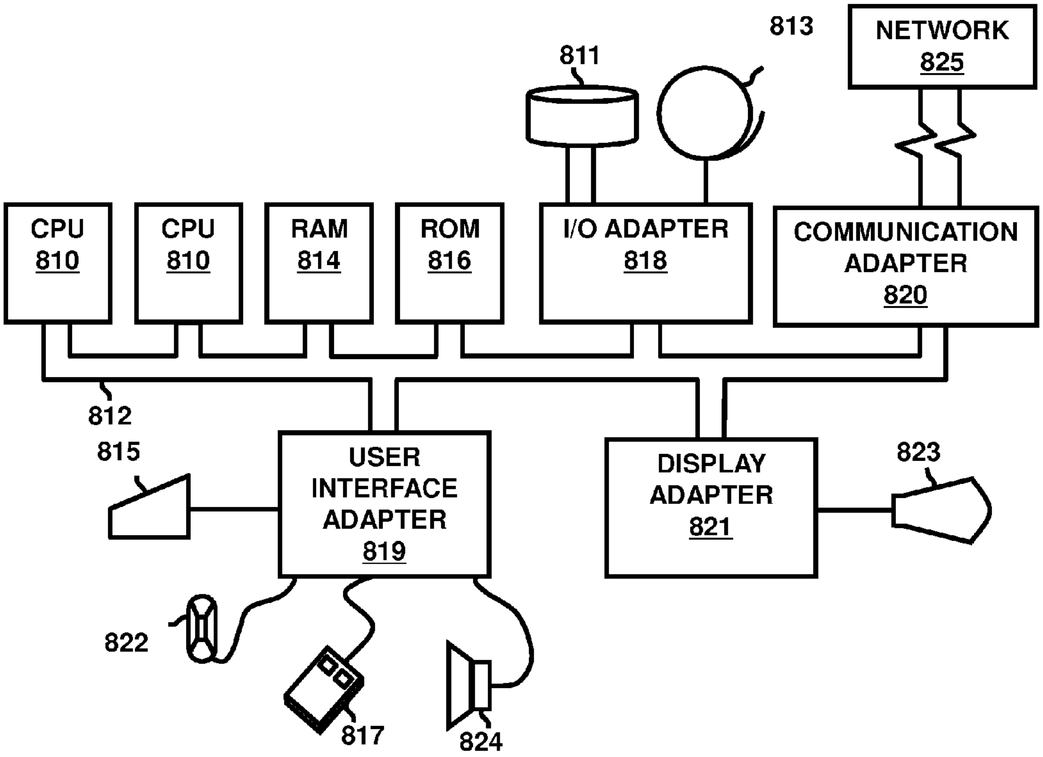
FIG. 8 is a schematic diagram illustrating an exemplary hardware environment for implementing the disclosed embodiments.

A representative hardware environment is depicted in FIG. 8 for implementing the system, method and program storage device (i.e., computer program product) embodiments, as discussed in detail above. This schematic drawing illustrates a hardware configuration of an information handling/computer system in accordance with the disclosed embodiments. The system comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system. The system can read the inventive instructions on the program storage devices and follow these instructions to execute the methodology of the disclosed embodiments. The system further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example. Alternatively, the disclosed system, method and program storage device embodiments could be implemented on any other type of computer system having the required memory, communication links and processing capability described (e.g., a laptop computer, tablet computer, etc.).

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises", "comprising", "included", and/or "including", when used in this specification, specify the presence of stated features, integers, steps, operations, elements, and/or components, but do not preclude the presence or addition of one or more other features, integers, steps, operations, elements, components, and/or groups thereof. It should further be understood that corresponding structures, materials, acts, and equivalents of all means or step plus function elements in the claims below are intended to include any structure, material, or act for performing the function in combination with other claimed elements as specifically claimed. Finally, it should be understood that the above-description of the embodiments was presented for purposes of illustration and was not intended to be exhaustive or limiting. Many modifications and variations will be apparent to those of ordinary skill in the art without departing from the scope and spirit of the disclosed embodiments.

What is claimed is:

1. A system for locating objects within a defined area, said system comprising:

radio frequency identification tags on said objects in said defined area such that a specific object has a radio frequency identification tag;

a memory storing a database of said objects, said database associating said objects with corresponding users having permission to locate said objects;

a handheld user interface device within said defined area;

an additional radio frequency identification tag on said handheld user interface device;

a computer, said handheld user interface device receiving, from a specific user, a request to locate said specific object within said defined area and wirelessly communicating said request to said computer, and said computer accessing said database in response to said request and verifying that said specific user has permission to locate said specific object; and, at least three radio frequency identification readers within said defined area, said computer, upon verification that said specific user has said permission to locate said specific object, causing one of said radio frequency identification readers to transmit a radio frequency activation signal, said radio frequency identification tag on said specific object automatically transmitting a radio frequency response signal in response to said radio frequency activation signal, said additional radio frequency identification tag on said handheld user interface device automatically transmitting an additional radio frequency response signal in response to said radio frequency activation signal, each of said radio frequency identification readers receiving said radio frequency response signal and said additional radio frequency response signal, and said computer triangulating a position of said specific object based on differences in said radio frequency response signal as received by each of said radio frequency identification readers, triangulating a position of said handheld user interface device and, thereby a position of said specific user, based on differences in said additional radio frequency response signal as received by each of said radio frequency identification readers and further communicating, to said specific user through said handheld user interface device, said position of said specific object relative to said position of said specific user.

2. The system of claim 1, said handheld user interface device comprising any one a single-function object locator device and a smart phone having an object locator application.

3. The system of claim 1, said computer communicating said position of said specific object by causing said handheld user interface device to display a map of said defined area with an indicator marking said position of said specific object.

4. The system of claim 1, said computer communicating said position of said specific object by causing said handheld user interface device to any one of display a text message and play a voice message.

5. The system of claim 1, said computer further communicating, to said specific user through said handheld user interface device, said position of said specific object relative to a position of a stationary object in said defined area.

6. The system of claim 5, said position of said stationary object being previously established using said handheld user interface device, being previously tagged with a descriptive tag using said handheld user interface device, being stored in said database and further being associated with said descriptive tag in said database.

7. The system of claim 1, said computer communicating of said position of said specific object relative to said position of said specific user comprising notifying said specific user of a distance to said specific object.

8. The system of claim 1, said database further associating unique voiceprints with said corresponding users, said handheld user interface device comprising a microphone, said request being a verbal request from said specific user received through said microphone, and said computer authenticating said specific user by comparing said verbal request to a unique voiceprint associated in said database with said specific user.

9. The system of claim 1, said database further associating unique biometric identifiers with said corresponding users, said handheld user interface device further comprising a biometric sensor receiving biometric input from said specific user, said biometric input comprising any of a fingerprint scan, a retinal scan, and a face scan, and said computer authenticating said specific user by comparing said biometric input to a unique biometric identifier associated in said database with said specific user.

10. A computer-implemented method for locating objects within a defined area, said method comprising:

storing, in memory, a database of said objects, said database associating said objects with corresponding users having permission to locate said objects and said objects each having radio frequency identification tags such that a specific object has a radio frequency identification tag;

receiving, by a computer a from a handheld user interface device within said defined area and in wireless communication with said computer, a request from a specific user to locate said specific object, said handheld user interface device having an additional radio frequency identification tag;

accessing, by said computer in response to said request, said database and verifying that said specific user has permission to locate said specific object;

after said verifying, causing, by said computer, one of at least three radio frequency identification readers within said defined area to transmit a radio frequency activation signal, said radio frequency identification tag on said specific object automatically transmitting a radio frequency response signal in response to said radio frequency activation signal, said additional radio frequency identification tag on said handheld user interface device automatically transmitting an additional radio frequency response signal in response to said radio frequency activation signal, and said radio frequency identification readers receiving said radio frequency response signal and said additional radio frequency response signal;

triangulating, by said computer, a position of said specific object based on differences in said radio frequency response signal as received by each of said radio frequency identification readers;

triangulating, by said computer, a position of said handheld user interface device and, thereby a position of said specific user based on differences in said additional radio frequency response signal as received by each of said radio frequency identification readers; and communicating, by said computer to said specific through said handheld user interface device, said position of said specific object relative to said position of said specific user.

11. The method of claim 10, said handheld user interface device comprising any one a single-function object locator device and a smart phone having an object locator application.

12. The method of claim 10, said communicating of said position of said specific object comprising causing said handheld user interface device to display a map of said defined area with an indicator marking said position of said specific object.

13. The method of claim 10, said communicating of said position of said specific object comprising causing said handheld user interface device to any one of display a text message and play a voice message.

14. The method of claim 10, said communicating of said position of said specific object comprising further communicating said position of said specific object relative to a position of a stationary object in said defined area.

15. The method of claim 14, further comprising, before said receiving of said request, establishing said position of said stationary object using said handheld user interface device, tagging said position of said stationary object with a descriptive tag using said handheld user interface device, storing said position of said stationary object in said database and further associating said stationary object with said descriptive tag in said database.

16. The method of claim 10, said communicating of said position of said specific object relative to said position of said specific user comprising notifying said user of a a distance to said specific object.

17. The method of claim 10, said receiving of said request comprising receiving a verbal request through a microphone of said handheld user interface device, said database further associating unique voiceprints with said corresponding users; and said method further comprising authenticating, by said computer, said specific user by comparing said verbal request to a unique voiceprint associated in said database with said specific user.

18. The method of claim 10, said database further associated storing unique biometric identifiers with said corresponding users, and said method further comprising:

receiving biometric input from said specific user through a biometric sensor on said handheld user interface device, said biometric input comprising any of a fingerprint scan, a retinal scan, and a face scan; and authenticating, by said computer, said specific user by comparing said biometric input to a unique biometric identifier associated in said database with said specific user.

19. A non-transitory program storage device readable by a computer and tangibly embodying a program of instructions executable by said computer to perform a method for locating objects within a defined area, said method comprising:

storing, in memory, a database of said objects, said database associating said objects with corresponding users having permission to locate said objects and said objects each having radio frequency identification tags such that a specific object has a radio frequency identification tag;

receiving, through wireless communication with a handheld user interface device within said defined area, a request from a specific user to locate said specific object, said handheld user interface device having an additional radio frequency identification tag;

accessing said database and verifying that said specific user has permission to locate said specific object;

after said verifying, causing one of at least three radio frequency identification readers within said defined area to transmit a radio frequency activation signal, said radio frequency identification tag on said specific object automatically transmitting a radio frequency response signal in response to said radio frequency activation signal, said additional radio frequency identification tag on said handheld user interface device automatically transmitting an additional radio frequency response signal in response to said radio frequency activation signal, and said radio frequency identification readers receiving said radio frequency response signal;

triangulating a position of said specific object based on differences in said radio frequency response signal as received at each of said radio frequency identification readers;

triangulating a position of said handheld user interface device and, thereby a position of said specific user based on differences in said additional radio frequency response signal as received by each of said radio frequency identification readers; and communicating, to said specific user through said handheld user interface device, said position of said specific object relative to said position of said specific user.

20. The program storage device of claim 19, said communicating of said position of said specific object comprising any of the following:

causing said handheld user interface device to display a map of said defined area with an indicator marking said position of said specific object;

causing said handheld user interface device to display a text message; and causing said handheld user interface device to play a voice message.

* * * * *